United States Patent [19]

Hutchison et al.

[11] Patent Number: 4,754,869

[45] Date of Patent: Jul. 5, 1988

[54] DOWN FLOW DISTRIBUTOR

[76] Inventors: Donald S. Hutchison, Rte. 2, Box 1390, Cushing, Okla. 74023; Thomas D. P. Kiser, Jr., 621 W. Cherry, Drumright, Okla. 74030

[21] Appl. No.: 53,002

[22] Filed: May 22, 1987

[51] Int. Cl.$^4$ .............................................. B65G 47/20
[52] U.S. Cl. ................................... 198/536; 414/301; 239/666; 239/688; 239/488; 193/3
[58] Field of Search ................ 198/535, 536, 640–642; 414/133, 144, 301, 293; 239/664–666, 681, 688, 463, 689, 488; 193/3, 22, 30; 222/526, 564, 547

[56] References Cited

U.S. PATENT DOCUMENTS

| | | | |
|---|---|---|---|
| 797,073 | 8/1905 | Perry | 198/536 |
| 846,751 | 3/1907 | Melvin . | |
| 936,182 | 10/1909 | Steidle . | |
| 983,923 | 2/1911 | Munn et al. | 198/535 |
| 1,539,559 | 5/1925 | Hamachek | 198/536 |
| 1,663,173 | 3/1928 | Pioda . | |
| 2,994,460 | 8/1961 | Matthews | 222/145 |
| 3,780,887 | 12/1973 | Bottoms | 193/3 |
| 4,040,529 | 8/1977 | Wurdeman et al. | 414/301 |
| 4,216,914 | 8/1980 | O'Hanlon | 239/666 |
| 4,264,213 | 4/1981 | Dillman | 366/9 |
| 4,277,214 | 7/1981 | Mahle et al. | 193/30 |

Primary Examiner—Joseph E. Valenza
Attorney, Agent, or Firm—Robert E. Massa

[57] ABSTRACT

An apparatus for providing uniform distribution of aggregate material has a rotatable hopper mounted on a support frame to receive aggregate material from an apparatus supplying aggregate material. Attached to the rotatable hopper, and in communication with a discharge opening of the hopper, is a chute extending downwardly and angularly outwardly from the axis of rotation of the hopper. The chute includes a baffle which responds to the gravitational force applied by the flow of aggregate down the chute to cause rotation of the hopper and thereby provide for uniform spreading of aggregate beneath the hopper. A modified version includes a first hopper pivotally mounted on the support frame in a manner to receive aggregate from the supply apparatus and a second hopper rotatably mounted beneath the first hopper with the chute attached to the rotatable hopper to receive aggregate from the rotatable hopper and cause rotation of the rotatable hopper. A further modification includes a support frame attached to a conveyor in a position to receive aggregate material from the conveyor. The chute may include two sections slidably connected and having a winch adaptable to control the length of the chute. A wind vane may be positioned on the rotatable hopper to react to wind flow to provide smoother rotation of the rotatable hopper.

21 Claims, 3 Drawing Sheets

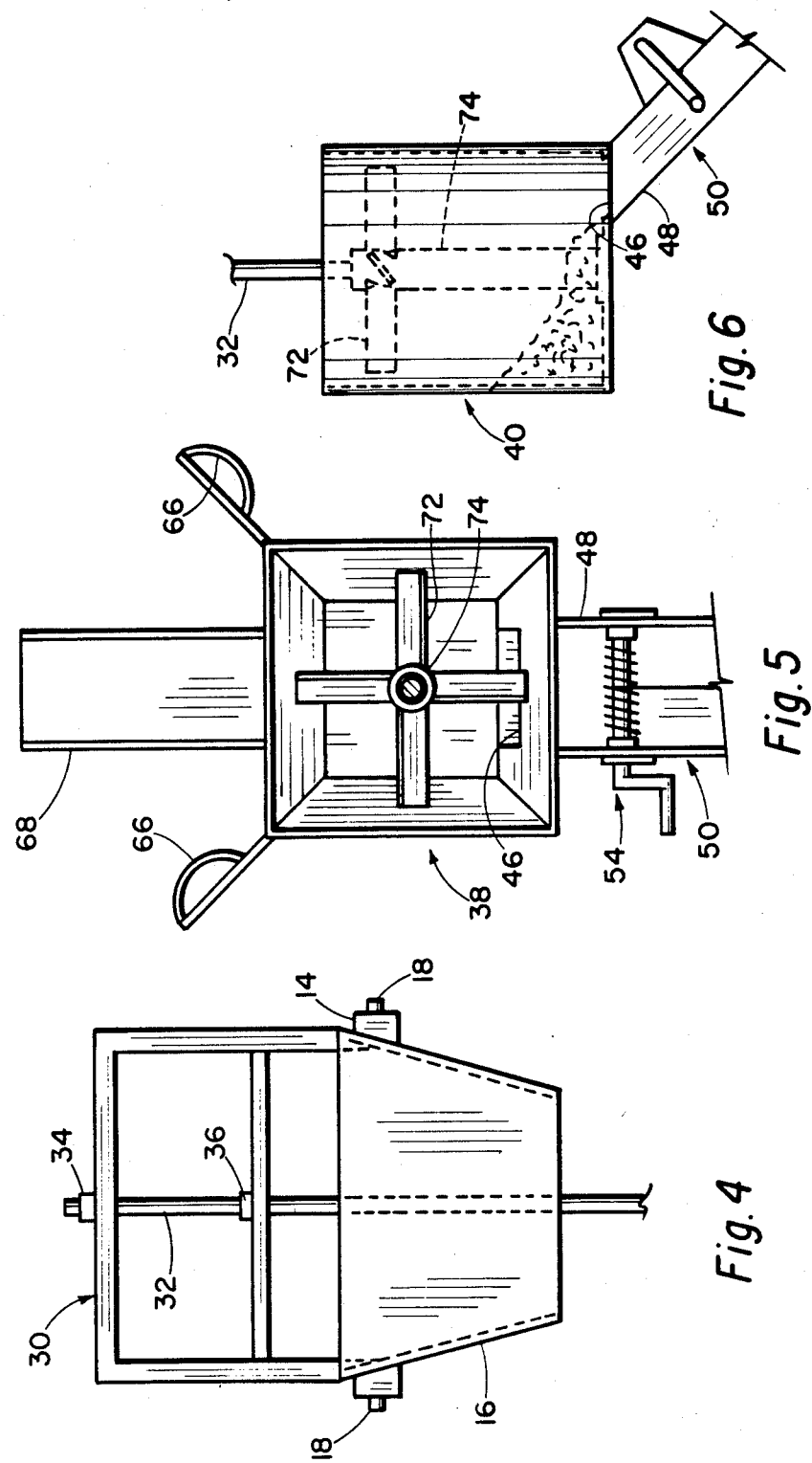

DOWN FLOW DISTRIBUTOR

FIELD OF THE INVENTION

Our invention relates to apparatus for providing uniform distribution of aggregate material. More particularly, our invention relates to apparatus which receives aggregate material from a source of supply, such as a storage area, storage bin, or storage pile, and distributes the aggregate material uniformly over a wide area by operation of a rotatable chute which is part of the receiving apparatus. Still more particularly, our invention relates to apparatus for uniform distribution of solid particles over a circular area by means of a rotatable chute which is powered in its circular movement by the force provided by the flow of the solid particles downwardly of the chute. In other words, gravity provides the energy to drive the chute rotatably.

BACKGROUND OF THE INVENTION

Various solid particle materials are subject to totally different treatment by many different industries. The suitable control of solid particle sizes might be important should the solid particles be within an aqueous mixture, an organic fluid mixture, or a dry mix of only solid particles.

In those industries which incorporate the treatment of a dry mixture of solid particles in their processes, the treatment of that dry mixture might be for two different purposes. For one purpose, a separation of a mixture of solid particles into numerous groups of particles with particles within each group being of a close range of particle size might be required. For another purpose, a treatment of the solid particle mixture might be intended to maintain a uniform mixture of the solid particles.

For example, in the coal industry, one step in the process of preparing coal for the various markets would be the separation, as by screening, of the coal into a series of particle size groups with each group comprising a chosen narrow range of particle size. The different screened sizes have been found most suitable for the various end uses. For domestic purposes, a large size range has been most beneficial. For some domestic purposes and some industrial purposes, a clean, graded coal of smaller size is preferred. Then, for carbonization, that is, the process of making coke, a still smaller size is preferred. Eventually, even the solid particles resulting from the process of preparing coke are separated into various particle sizes. Other industries give similar exemplary treatment to mixtures of solid particles.

If carried to an extreme, this type of treatment of a mixture of solid particles might be described as separating the particles into "homogeneous" portions.

In the second type of treatment of a mixture of solid particles referred to above, the purpose is to maintain, or develop, a uniform mixture of the solid particles in toto.

We are most knowledgeable about, and concerned with, the problem within the construction industry in handling, storing, and dispensing, crushed rock and sand.

As used in the construction industry, a supply of crushed rock, or other hard, inert material, of various sizes is generally referred to as an "aggregate". The attempt in the construction industry is always to try to maintain a "uniform mixture" of the aggregate, that is, an aggregate which has the various sized particles distributed evenly throughout the aggregate.

Aggregate material, crushed rock, gravel, or sand, is always accumulated by the supplier in extremely large quantities, as it is received in great quantities and dispensed in great quantities. In such great quantities, the consistent maintenance of a uniform mixture has always been difficult with the traditional means of handling or transferring the bulk material. For example, in the use of a conveyor system, the aggregate falls off the end of the conveyor and forms a conical pile, but the particles of the aggregate quickly separate according to their particle size, and the total aggregate is no longer a uniform mixture.

Typically, the supporting structure of the conveyor that is transferring this aggregate material remains stationary with the end of the conveyor positioned above a particular point while discharging the aggregate.

Aggregate suppliers and concrete suppliers store aggregate material in large piles as they receive it. Consequently, as described above, the aggregate material has become considerably non-uniform, and this non-uniformity usually affects the quality of the end product. In both the construction industry and the road building industry, the contractors want to build with concrete having a uniform aggregate throughout the concrete structure, not a concrete in one portion of the structure incorporating a limited range of small particles and in another area having a limited range of larger particles, although each might barely qualify for the construction according to contractual specifications.

The characteristics of a mixture of solid particles to separate according to size as we have described, is fully acknowledged in various industries. As a result, many attempts have been made to prevent this size segregation. The following patents which we have found in the prior art are examples of the recognition of this problem and the various methods employed in attempting to prevent size segregation:

| U.S. Pat. No. 846,751   | Melvin   | March 12, 1907  |
|-------------------------|----------|-----------------|
| U.S. Pat. No. 936,182   | Steidle  | Oct. 5, 1907    |
| U.S. Pat. No. 1,663,173 | Pioda    | March 20, 1928  |
| U.S. Pat. No. 2,994,460 | Matthews | August 1, 1961  |
| U.S. Pat. No. 4,264,213 | Dillman  | April 28, 1981  |

SUMMARY OF THE INVENTION

The primary object of our invention is to provide a material distributing apparatus which will efficiently control the movement of a mixture containing solid particles of various sizes so that the mixture of solid particles will remain a uniform mixture.

Another object of our invention is to provide a material distributing apparatus which is efficient in the handling of material, inexpensive, and easy to operate.

Still another object of our invention is to provide a material distributing apparatus for the efficient handling of mixtures of solid particles and assuring a uniform mixture of the solid particles.

Still another object of our invention is to provide a material distributing apparatus which will transfer a mixture of solid particles while preventing size segregation of the solid particles Still another object of our invention is to provide a material distributing apparatus which operates by the force of gravity generated by the movement of the material through the apparatus.

Still another object of our invention is to provide a mixture distributing apparatus which is capable of enhancing uniformity of a mixture of solid particles which the apparatus is transferring to a storage site.

We have devoted a great deal of time to the study of processes for furnishing aggregate material to the construction industry, and believe that we have designed and developed efficient equipment for handling and transferring this aggregate material to the benefit of all parties concerned with the supply, movement, and use of aggregate material.

In its most general concept, our apparatus comprises a rotatable hopper, which is adaptable to receive aggregate material from a means for supplying the aggregate material, and which rotates by force of gravity to spread the aggregate material evenly and uniformly over a wide area.

Most importantly, we have designed our apparatus to comprise a receiving hopper mountable on a support frame and which is made to rotate by the force of gravity supplied by the flow of material flowing from a lower opening of the hopper through a chute extending downwardly and angularly outwardly from the axis of rotation of the hopper.

The combination of gravitational force developed by the flow of material, angular extension of the chute component, and geometrical construction of the hopper, cooperate to assure uniform mixture of aggregate material within the hopper and uniform mixture of the aggregate material over a wide area, rather than permitting the aggregate to segregate by particle size as has been a bothersome problem throughout history.

In summary, our down flow uniform distribution apparatus comprises a support frame, which may be a stationary, independent frame or may be attached to an apparatus supplying the aggregate material, such as a conveyor system which receives the aggregate material from some further source of supply. A rotatable hopper mounted on the support frame has therein a discharge opening in communication with a chute attached to the hopper. The chute extends downwardly and angularly from the axis of rotation of the hopper and responds to the flow of aggregate to cause rotation of the hopper. Then, the chute may also include a baffle at a chosen location to further respond to the flow of material and enhance the rotation and distribution of aggregate.

We have conceived of the support frame for our apparatus as being either an independent support frame to which the rotatable hopper is attached, or a frame by which the hopper is attached to a conveyor system near the end of a conveyor delivery unit, such as a belt. The hopper may be pivotally attached to the support frame to permit easy control and balance.

In one version of our distribution apparatus we have provided a dual hopper system in which a first, or direct, hopper may be pivotally mounted on the support frame, and a second hopper rotatably mounted beneath the first hopper. For most uses, the dual hopper version is found to be advantageous in further developing a uniform mixture of aggregate material. However, when more storage room is needed, or spacing for the equipment is limited, the rotating hopper could be used without the direct hopper.

We have further designed our distribution apparatus to include a downwardly and angularly extending chute which has a baffle positioned near its lower end which provides means for generating the gravitational force and work energy to cause the rotation of the rotatable hopper. As the heavy aggregate particles flow down the chute, the particles build up momentum, strike the baffle when it is suitably positioned, and urge the baffle to move, thus causing the entire chute to rotate. In addition, we have designed the chute, in one model, to comprise two sections slidably connected so that the length of the chute may be adjusted as desired.

BRIEF DESCRIPTION OF THE DRAWINGS

FIG. 4 is a front elevational view of a first, or direct, hopper of our down flow distribution apparatus.

FIG. 5 is a top view of a rotatable hopper of our down flow distribution apparatus showing a portion of a chute attached thereto.

FIG. 6 is a side elevational view of a modified form of down flow distribution apparatus as it would be employed as a single hopper rotatably attached to a support frame.

DESCRIPTION OF THE PREFERRED EMBODIMENTS

Figure 1:
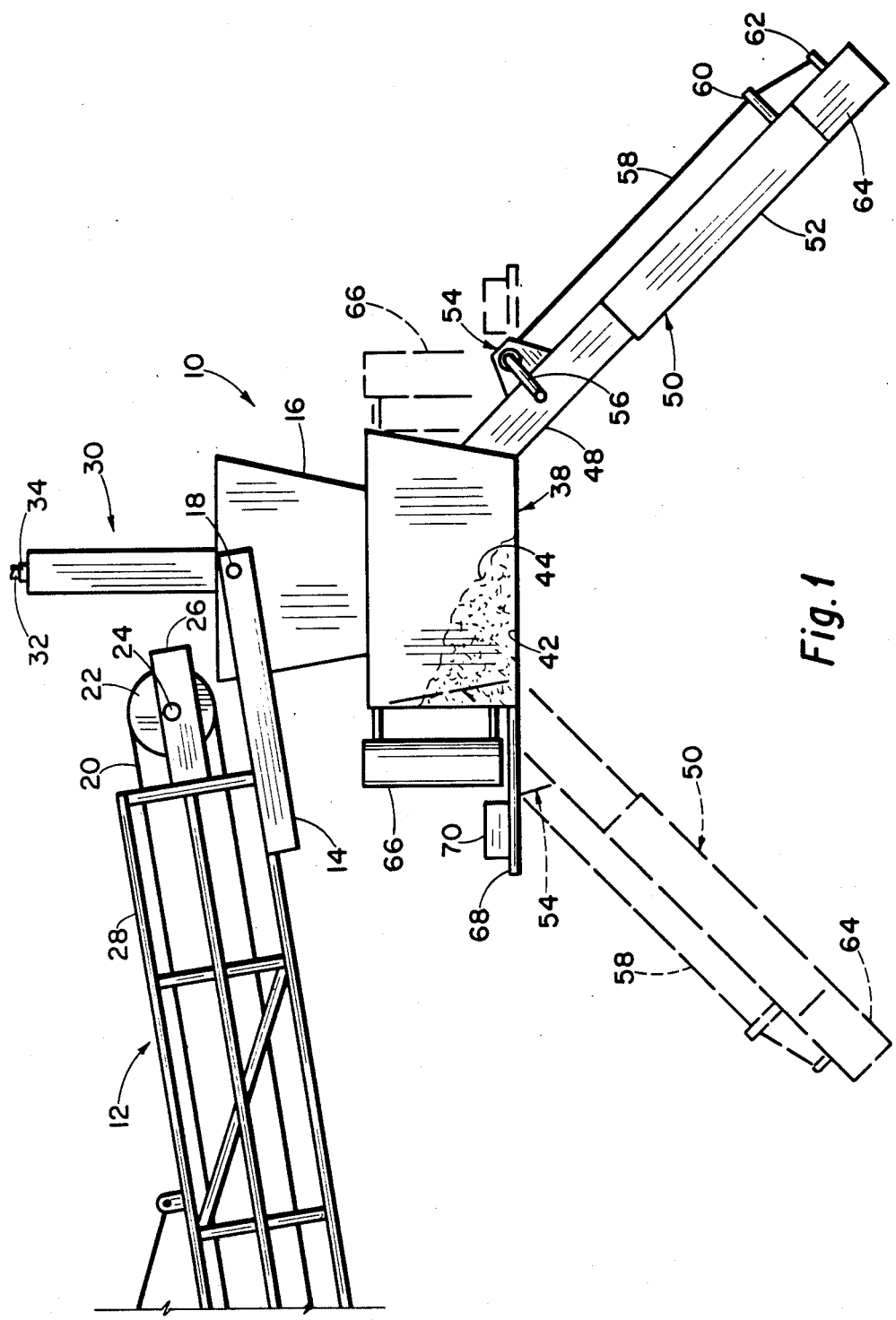
FIG. 1 is a side elevational view of a down flow distribution apparatus according to our invention showing a front portion of a conveyor system to which the distribution apparatus is attached.

FIG. 1 is a side elevational view of a down flow distribution apparatus 10, generally, according to our invention, as it would be in position for use, but, for simplicity, not showing aggregate material moving through the apparatus, and showing only a portion of a conveyor system 12, generally, to which the distribution apparatus 10 is connected by means of one form of support frame 14. We have described above the different types of support frames which we may use, including large, stationary frames independent of the conveyor or supply system, or the type shown in FIG. 1 in which we have attached the apparatus 10 to a conveyor system 12 in a manner so that a first hopper 16 is pivotally attached to support frame 14 by means of pins 18. In this model we have placed the first hopper 16 slightly to the front of, and slightly below, the end of a conveyor belt 20 as the conveyor belt moves around conveyor roller 22 supported by axle 24 of frame member 26 extending from conveyor frame 28.

Figure 2:
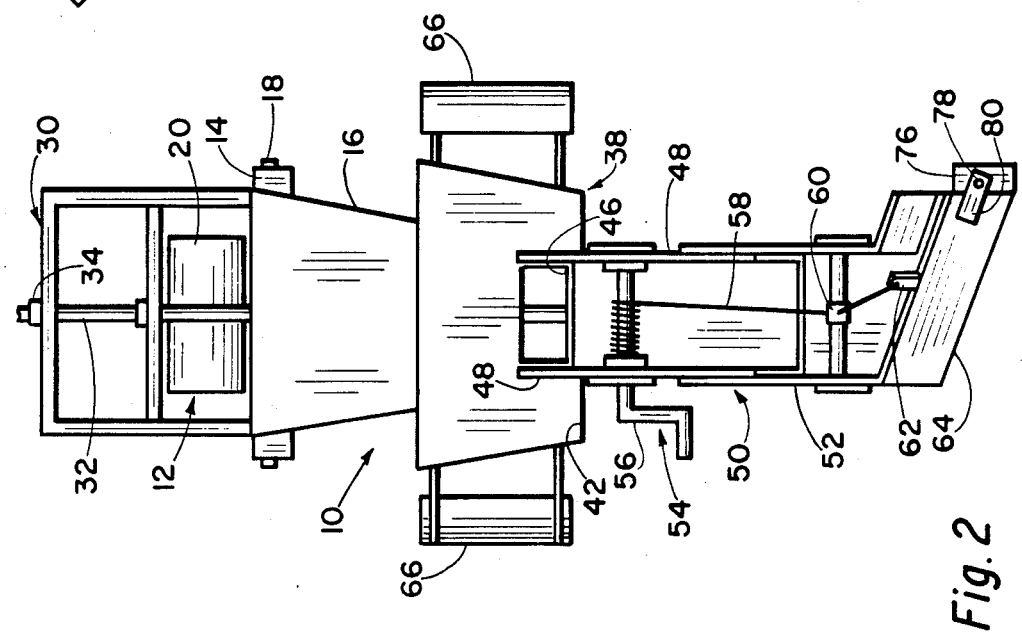
FIG. 2 is a front elevational view of the down flow distribution apparatus shown in FIG. 1.

Attached to and above first hopper 16 is frame 30, generally, through which a central shaft 32, shown clearly in FIGS. 2, 4, and 6, is mounted bearably and supported by a thrust bearing 34 and central bearing 36. Central shaft 32 supports rotatably a rotatable hopper 38, generally, shown in FIG. 1 as being rhombohedral in geometry, and as cylindrical hopper 40, generally in FIG. 6, and which, as we have described above, may be of various suitable shapes, such as substantially pyramidal or substantially conical. When a first hopper 16 is used in combination with rotatable hopper 38, aggregate material being poured into first hopper 16 becomes, to some degree, somewhat more uniformly mixed. Then, preferably, regardless of the geometrical shape of the rotatable hopper 38, that rotatable hopper should have a flat floor 42 which, as shown in FIG. 1, allows aggregate material particles 44 to build up in order to help direct the flow of aggregate material through a discharge opening 46 and also to help counterbalance the apparatus 10.

We have designed an upper end portion 48 of chute 50, generally, to be attachable to rotatable hopper 38 in communication with discharge opening 46 to provide for the discharge of aggregate material as the material builds up within rotatable hopper 38. As we have suggested, the chute 50 may be an integral component or may be an adjustable, slidable chute as shown wherein an upper end portion 48 cooperates slidably with lower portion 52 for easy adjustment by the user wherever necessary. To ease the adjustment of the chute 50, we have also designed a winch member 54, generally, controlled by a handle 56 extending through, and rotatably positioned in, end portion 48 to wind a cable 58 passing through a cable guide 60 and attached to an eyelet member 62 secured on a baffle 64 adjacent the lower end of the chute 50.

We have developed our down flow distributor whereby most of the power to rotate the rotatable hopper 38, and thus distributing uniformly the aggregate material passing through the distributor, is supplied by the gravitational force developed by the aggregate material flowing down the chute 50 and striking the baffle 64. A typical size for our distributor, although many sizes are possible, is that the chute 50 may be adjustable in length from seven to fourteen feet, may extend from the rotatable hopper at an angle of forty-five degrees, may rotate at a rate of nine or ten revolutions per minute, and may deliver a uniform mixture of aggregate at a rate of fifty tons per hour.

We have found that we can assure a smoother rotation by placing a pair of wind vanes 66 at the sides of the rotatable hopper 38 as shown in FIGS. 1, 2, 3, and 5.

Also, wherever necessary, we have provided means for balancing the distribution apparatus 10 during use by attachment of a balance frame 68 upon which, or to which, weighted components 70 may be positioned. Quite obviously, the amount of such weights will depend upon the particular variables at the time of use.

Figure 3:
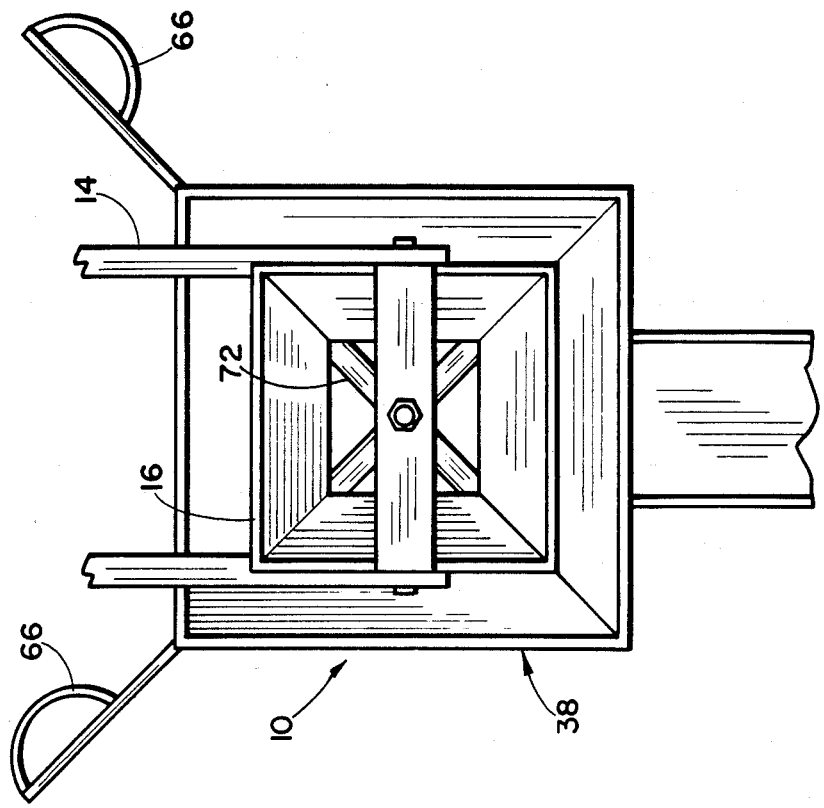
FIG. 3 is a top view of a down flow distribution apparatus according to our invention showing fragmentary portions of a support frame and delivery chute.

In the various forms of structure that we may use, as described above and exemplified by those shown in the figures, we have provided a set of paddles 72, as shown in FIGS. 3, 5, and 6 attached to a central pipe section 74 which is placed over central shaft 32 and attached to the sides of hoppers 38, or 40, or the like. Preferably, these paddles 72 should be of angle iron construction as shown in FIG. 6. The geometry of these paddles 72 need not be right angle, but, we have found that this angle iron construction is preferable because aggregate material builds up as shown in FIG. 6 and thus protects the paddles 72 from the erosive pounding which would otherwise be given by the aggregate material. As we have shown, the build up of aggregate material provides a surface which resembles the surface of a slanted bar.

Then, for additional control of the deflecting action, we have provided a small hinged deflector shield 76 attached to the baffle 64 and controllable in position by a set screw 78 in position on a small plate member 80 welded to baffle 64.

With the circular geometry of the rotatable hopper 40 shown in FIG. 6, we are expressing clearly several of the thoughts we have discussed above. First, we want to emphasize that the shape of the rotatable hopper may vary from the rhombohedral shape shown in FIG. 1. Secondly, the rotatable hopper may be used individually without being attached below a first hopper 16 wherever circumstances may allow, and also, the individual hopper may not require the addition of heavy counterbalancing weights.

Since many different embodiments of this invention may be made without departing from the spirit and scope thereof, it is to be understood that the specific embodiments described in the scope of the invention is best defined by the appended claims.

We claim:

1. An apparatus for providing uniform distribution of aggregate material, comprising:
   a support frame,
   a first hopper pivotally mounted on the support frame, the hopper adapted to receive aggregate material from a means for supplying aggregate material,
   the hopper having a discharge opening in the bottom for passage of aggregate material,
   a second hopper rotatably mounted beneath the first hopper on a shaft extending upwardly through the discharge opening in the first hopper and journaled in a frame member above the first hopper,
   the second hopper adapted to receive aggregate material from the first hopper and having a discharge opening for further passage of aggregate material, and
   a chute attached to the second hopper in communication with the discharge opening of the second hopper, and extending downwardly and angularly outwardly from the axis of rotation of the second hopper, and including means for causing rotation of the second hopper in response to the gravitational force applied by the flow of aggregate down the chute, thereby providing for uniform spreading of aggregate material.

2. An apparatus for providing uniform distribution of aggregate material as described in claim 1, wherein:
   a pair of paddles are mounted within the second hopper to assist in mixing of aggregate material passing through the second hopper.

3. An apparatus for providing uniform distribution of aggregate material as described in claim 2, wherein:
   the means for causing rotation of the second hopper in response to the gravitational force applied by the flow of aggregate down the chute, includes:
   a baffle member positioned adjacent the lower end of the chute which deflects aggregate material flowing down the chute.

4. An apparatus for providing uniform distribution of aggregate material as described in claim 3, wherein:
   the support frame comprises a support member attached to a conveyor frame adjacent a conveyor delivery component.

5. An apparatus for providing uniform distribution of aggregate material as described in claim 4, wherein:
   the chute comprises two chute sections adjustably and cooperatively slidably connected to permit easy adjustment of the length of the chute.

6. An apparatus for providing uniform distribution of aggregate material as described in claim 5, wherein:
   the chute includes winch means mounted thereon and operatively connecting the chute sections to control and adjust the length of the chute.

7. An apparatus for providing uniform distribution of aggregate material as described in claim 6, wherein:
   the second hopper includes a pair of wind vanes mounted on a side of the hopper opposite the chute to react to wind flow and thereby provide a smoother rotation of the second hopper in cooperation with the gravitational force of aggregate material flowing down the chute.

8. An apparatus for providing uniform distribution of aggregate material as described in claim 1, wherein:
the support frame comprises a support member attached to a conveyor frame adjacent a conveyor delivery component.

9. An apparatus for providing uniform distribution of aggregate material as described in claim 8, wherein:
the chute comprises two chute sections adjustably and cooperatively slidably connected to permit easy adjustment of the length of the chute.

10. An apparatus for providing uniform distribution of aggregate material as described in claim 9, wherein:
the chute includes winch means mounted thereon and operatively connecting the chute sections to control and adjust the length of the chute.

11. An apparatus for providing uniform distribution of aggregate material as described in claim 10, wherein:
the second hopper includes a pair of wind vanes mounted on a side of the hopper opposite the chute to react to wind flow and thereby provide a smoother rotation of the second hopper in cooperation with the gravitational force of aggregate material flowing down the chute.

12. An apparatus for providing uniform distribution of aggregate material as described in claim 1, wherein:
the means for causing rotation of the second hopper in response to the gravitational force applied by the flow of aggregate down the chute, includes:
a baffle member positioned adjacent the lower end of the chute which deflects aggregate material flowing down the chute.

13. An apparatus for providing uniform distribution of aggregate material as described in claim 12, wherein:
the support frame comprises a support member attached to a conveyor frame adjacent a conveyor delivery component.

14. An apparatus for providing uniform distribution of aggregate material as described in claim 13, wherein:
the chute comprises two chute sections adjustably and cooperatively slidably connected to permit easy adjustment of the length of the chute.

15. An apparatus for providing uniform distribution of aggregate material as described in claim 14, wherein:
the chute includes winch means mounted thereon and operatively connecting the chute sections to control and adjust the length of the chute.

16. An apparatus for providing uniform distribution of aggregate material as described in claim 15, wherein:
the second hopper includes a pair of wind vanes mounted on a side of the hopper opposite the chute to react to wind flow and thereby provide a smoother rotation of the second hopper in cooperation with the gravitational force of aggregate material flowing down the chute.

17. An apparatus for providing uniform distribution of aggregate material, comprising:
a support frame,
a rotatable hopper positioned on the support frame, the hopper adapted to receive aggregate material from a means for supplying aggregate material,
the hopper having a discharge opening for passage of aggregate material,
the hopper further including a balance frame upon which a weighted component is positioned for balancing the distribution apparatus, and
a chute attached to the rotatable hopper in communication with the discharge opening, and extending downwardly and angularly outwardly from the axis of rotation of the hopper, the chute comprising at least an upper portion and a lower portion, the chute portions being adjustably and cooperatively slidably connected to permit easy adjustment of the length of the chute,
the chute including a baffle member adjacent the lower end of the chute which deflects aggregate material flowing down the chute to cause rotation of the rotatable hopper in response to the gravitational force applied by the flow of the aggregate material, and
the chute further including a winch member attached to the upper portion and the baffle member operatively connecting the chute sections to control and adjust the length of the chute.

18. An apparatus for providing uniform distribution of aggregate material as described in claim 17, wherein:
the hopper includes a pair of wind vanes mounted on a side of the hopper opposite the chute to react to wind flow and thereby provide a smoother rotation of the hopper in cooperation with the gravitational force of aggregate material flowing down the chute.

19. An apparatus for providing uniform distribution of aggregate material as described in claim 18, wherein:
the baffle includes a hinged deflector shield controllable in position by a screw.

20. An apparatus for providing uniform distribution of aggregate material as described in claim 19, wherein:
a pair of paddles are mounted within the hopper to assist in mixing of aggregate material passing through the hopper.

21. An apparatus for providing uniform distribution of aggregate material as described in claim 20, wherein:
the support frame comprises a support member attached to a conveyor frame adjacent a conveyor delivery component.

* * * * *